United States Patent [19]

Fukuzawa et al.

[11] Patent Number: 4,792,021
[45] Date of Patent: Dec. 20, 1988

[54] SELF-COMPENSATING DEVICE FOR A DRUM BRAKE

[75] Inventors: Genichiro Fukuzawa, Ueda; Isao Idesawa, Toubu, both of Japan

[73] Assignee: Nissin Kogyo Kabushiki Kaisha, Nagano, Japan

[21] Appl. No.: 478,774

[22] Filed: Mar. 25, 1983

[30] Foreign Application Priority Data

Mar. 26, 1982 [JP] Japan .................. 57-48251
Apr. 13, 1982 [JP] Japan .................. 57-61388
May 31, 1982 [JP] Japan .................. 57-80058

[51] Int. Cl.⁴ .................. F16D 51/52; F16D 65/38; F16D 13/60
[52] U.S. Cl. .................. 188/79.62; 188/196 A; 192/111 A
[58] Field of Search ........ 188/196 A, 196 BA, 196 C, 188/196 D, 196 V, 71.9, 79.5 GE, 79.5 GC, 79.5 GT, 79.5 SC, 106 F, 79.5 R, 79.62; 192/70.25

[56] References Cited

U.S. PATENT DOCUMENTS

| | | | |
|---|---|---|---|
| 2,654,446 | 10/1953 | House .................. | 188/196 C |
| 2,747,694 | 5/1956 | Helvern .................. | 188/79.5 GE |
| 3,838,757 | 10/1974 | Farr .................. | 188/79.5 P |
| 4,056,173 | 11/1977 | Farr .................. | 188/71.9 |
| 4,369,863 | 1/1983 | Farr et al. .................. | 188/196 D X |

FOREIGN PATENT DOCUMENTS

| | | | |
|---|---|---|---|
| 0881920 | 9/1971 | Canada .................. | 188/71.9 |
| 2739003 | 3/1979 | Fed. Rep. of Germany ..... | 188/71.9 |
| 3527479 | 10/1979 | Japan . | |
| 1419115 | 12/1975 | United Kingdom ....... | 188/79.5 GE |

*Primary Examiner*—Douglas C. Butler
*Assistant Examiner*—Robert J. Oberleitner
*Attorney, Agent, or Firm*—Armstrong, Nikaido, Marmelstein & Kubovcik

[57] ABSTRACT

An improved self-compensating device for a drum brake of the type including a first member and a second member which together define a hydraulic chamber in a wheel cylinder, said first and second members being slidably but non-rotatably arranged relative to one another so that brake shoes are actuated by displacement of the members away from one another which is initiated by hydraulic pressure introduced into the hydraulic chamber. The self-compensation device is incorporated in the hydraulic chamber and has a function for inhibiting excessive compensation, essentially comprising an adjustment nut disposed in one of the first and second members so as not to be rotated relative to the latter and adapted to detachably abut against an abutment face formed on the one member, a spring means serving to urge the adjustment nut toward the abutment face, an adjustment rod threadably fitted through the adjustment nut, and a clutch member integrally secured to one end of the adjustment rod and rotatably supported in a clutch bore formed in the other member to cooperate with a clutching face formed on the other member. The clutch member is adapted to come the frictional contact with the clutching face when it is thrusted toward the latter by hgdraulic pressure in excess of a predetermined level in the hydraulic chamber and when it is thrusted toward the clutching face by means of a return spring for the brake shoes.

At least one air storage is provided on the other member and/or the clutch member which is opened to a bag chamber as defined by those members and extends upward when the device is mounted in use. Further, a distance piece may be removably disposed in an abutment area between the anchor of the other member and the corresponding brake shoe.

14 Claims, 5 Drawing Sheets

4,792,021

SELF-COMPENSATING DEVICE FOR A DRUM BRAKE

BACKGROUND OF THE INVENTION

1. FIELD OF THE INVENTION

The present invention relates to an improved self-compensating device for a drum brake and more particularly to a self-compensating device for a drum brake of the type including a first member and a second member together defining a hydraulic chamber in a wheel cylinder, said first and second members being arranged slidably but not rotatably relative to one another so that brake shoes are actuated by displacement of both the members away from one another which is initiated by hydraulic pressure introduced into the hydraulic chamber, wherein wearing of the brake shoes is automatically compensated to maintain a constant working clearance for the brake shoes, reliable braking is always assured by a predetermined amount of actuation of a brake actuating means such as brake pedal or the like, and inspection and maintenance are easily carried out for the drum brake.

2. DESCRIPTION OF THE PRIOR ART

As is well known, parts and components in a conventional drum brake are usually deformed elastically when heavy braking is initiated. Apparently, the elastic deformation thus developed is recognized as wearing of braking elements. It has been found out that when a conventional self-compensating device is operated in response to the elastic deformation after the latter has been developed, excessive compensation (over-adjustment) takes place, resulting in an occurance of so-called dragging phenomenon due to extremely reduced working clearance produced on release from the braked state. To obviate the foregoing problem there have been proposed a variety of self-compensating devices which are equipped with a mechanism for inhibiting excessive compensation. However, it has been pointed out as a drawback inherent to these proposed devices that the drum brake cannot be compactly constructed because the mechanism for inhibiting excessive compensation is disposed outside the hydraulic chamber of the wheel cylinder.

Further, it has been found that the drum brake with a self-compensation device incorporated therein has to encounter another problem that when the used brake shoes are to be replaced with new ones, removal of the brake drum in the axial direction is carried out only with much difficulties due to interference of the brake shoes with roughness on the inner surface of the brake drum because the aforesaid roughness is developed along the inner surface of the brake drum by its frictional sliding movements with respect to the brake shoes during long term operation of the drum brake and the brake shoes are displaced in the direction of expansion by means of the self-compensating device in response to their wearing for the purpose of compensating the latter.

To obviate the last mentioned problem there have been also proposed a plurality of improved drum brakes. The drum brake as disclosed in Japanese Published Utility Model NO. 35,274/79 is a typical one among them. Specifically, the drum brake proposed therein is the type in which a parking brake lever extending through a back plate is mechanically associated with a brake shoe at the innermost end thereof and further a stopper member for holding the parking brake lever in the inoperative position is fixedly secured to the back plate, the brake being improved in that an abutment piece is detachably mounted on the parking brake lever; and a stopper wall for holding the parking brake lever in the normal inoperative position with the aid of said abutment piece and a recessed part for allowing the parking brake lever to be retracted rearward from the inoperative position when releasing the abutment piece are provided on the stopper lever. Since the drum brake is constructed in that way, it is assured that the brake drum can be easily removed in the axial direction without hindrance due to roughness developed during operation of the drum brake on the inner surface of the brake drum, because a clearance between the brake drum and the brake shoe is amply enlarged by dismounting the abutment piece and thereby contracting the brake shoe from the normal inoperative position.

However, the contracting means for contracting the brake shoes to facilitate removal of the brake drum can be applied only to a drum brake of the type including the aforesaid parking brake lever and therefore the improved drum brake is available within a limited extent of application.

SUMMARY OF THE INVENTION

With the foregoing problems in mind it is an object of the present invention to provide an improved self-compensating device for a drum brake having a function for inhibiting excessive compensation, the device being incorporated in a hydraulic chamber of a wheel cylinder so that the whole drum brake is compactly constructed.

It is other object of the present invention to provide an improved self-compensating device for a drum brake of the above-mentioned type in which brake shoes are caused to be displaced away from one another for compensating their wear, wherein a brake drum can be easily removed in the axial direction without hindrance from the brake shoe merely by contracting the brake shoe from the normal inoperative position irrespective of whether a parking brake lever is provided or not.

To accomplish these objects, the present invention proposes a self-compensating device of the mentioned type essentially comprising an adjustment nut disposed non-rotatably in one of the first and second members which together define a hydraulic chamber in a wheel cylinder, said adjustment nut being adapted to detachably abut against an abutment face on the one member, a spring means serving to urge the adjustment nut toward said abutment face, an adjustment rod threadably fitted through the adjustment nut and having a multithread screw formed on a part thereof so as to assure threadable engagement with the adjustment nut, and a clutch member integrally secured to one end of the adjustment rod and rotatably supported in a clutch bore in the other one of the first and second members to cooperate with a clutching face formed on the inner wall of said clutch bore, wherein said clutch member is adapted to come in frictional contact with the clutch face when it is thrust toward the latter by hydraulic pressure in the hydraulic chamber which is in excess of a predetermined level and when it is thrust toward the clutching face under the influence of resilient force given by a return spring extended between both the brake shoes.

Further, the present invention proposes a drum brake of the type including a wheel cylinder, an anchor, a pair of brake shoes adapted to be rotated about the anchor by means of the wheel cylinder for enlargement operation, and a self-compensating device of the above type adapted to automatically enlarge and adjust the brake shoes for compensating wear of brake linings, wherein a spacer is removably disposed in the abutment area between the anchor and the corresponding brake shoe.

As described above, the self-compensating device according to the invention is constructed such that it is incorporated in the space between two members such as a cylinder housing and a piston, a pair of pistons or the like, which together define a hydraulic chamber in a wheel cylinder, and its compensating function is stopped when hydraulic pressure in the hydraulic chamber increases in excess of a predetermined level. Owing to this arrangement of the self-compensating device, an occurance of excessive compensation due to elastic deformation of parts and components in the drum brake is reliably avoided in the event of heavy braking which is initiated by excessive increase of hydraulic pressure in the hydraulic chamber above the predetermined level and moreover an occurance of so-called dragging phenomenon due to excessive compensation is also prevented. Further, due to the fact that the self-compensating device is incorporated in the hydraulic chamber there is no fear of causing interference with braking elements which are disposed outside the wheel cylinder so that the drum brake can be compactly designed and constructed. Further, since movable parts and components constituting the self-compensating device are always lubricated with hydraulic oil in the hydraulic chamber, there is no necessity for provision of any special lubricating means and smooth and reliable operation of the self-compensating device is assured at all time.

In another aspect of the invention, at least one air storage is provided which extends upward from a bag chamber located in the deepest part of a clutch bore. This arrangement assures that air is always maintained in the air storage for effecting engagement of a clutch member to or disengagement of the same from a clutching face and therefore there is no fear of causing any malfunction relative to the self-compensating function even when a sealing member is damaged or injured and thereby hydraulic oil in the hydraulic chamber leaks to the clutching face.

In still another aspect of the invention, a spacer is removably disposed in the abutment area between the anchor and the corresponding brake shoe in such a manner it can be removed therefrom by manual handling from the outside. This arrangement assures that a working clearance between the brake shoe and the brake drum can be enlarged merely by removing the distance piece and thereby displacing the brake shoes from the normal inoperative position in the direction of contraction whereby the brake drum can be easily removed in the axial direction without any interference of the brake shoe with any roughness which is developed on the inner surface of the brake drum due to frictional sliding contact therebetween. As a result, inspection and maintenance are quickly conducted at a high operative efficiency.

The spacer as described above is employable for all types of drum brakes with an anchor formed integrally therewith and therefore it has a wide extent of application.

Further, the spacer has an additional function of protecting the abutment face on the anchor against the brake shoe from wearing during operation and therefore there is no necessity for a reinforcement plate cast in the end face of the anchor as is embodied with the conventional drum brake.

Other objects, features and advantages of the present invention will become apparent from the reading of the following description made with reference to the accompanying drawings.

BRIEF DESCRIPTION OF THE DRAWINGS

The accompanying drawings will be briefly described below.

DETAILED DESCRIPTION OF THE PREFERRED EMBODIMENTS

Figure 1:
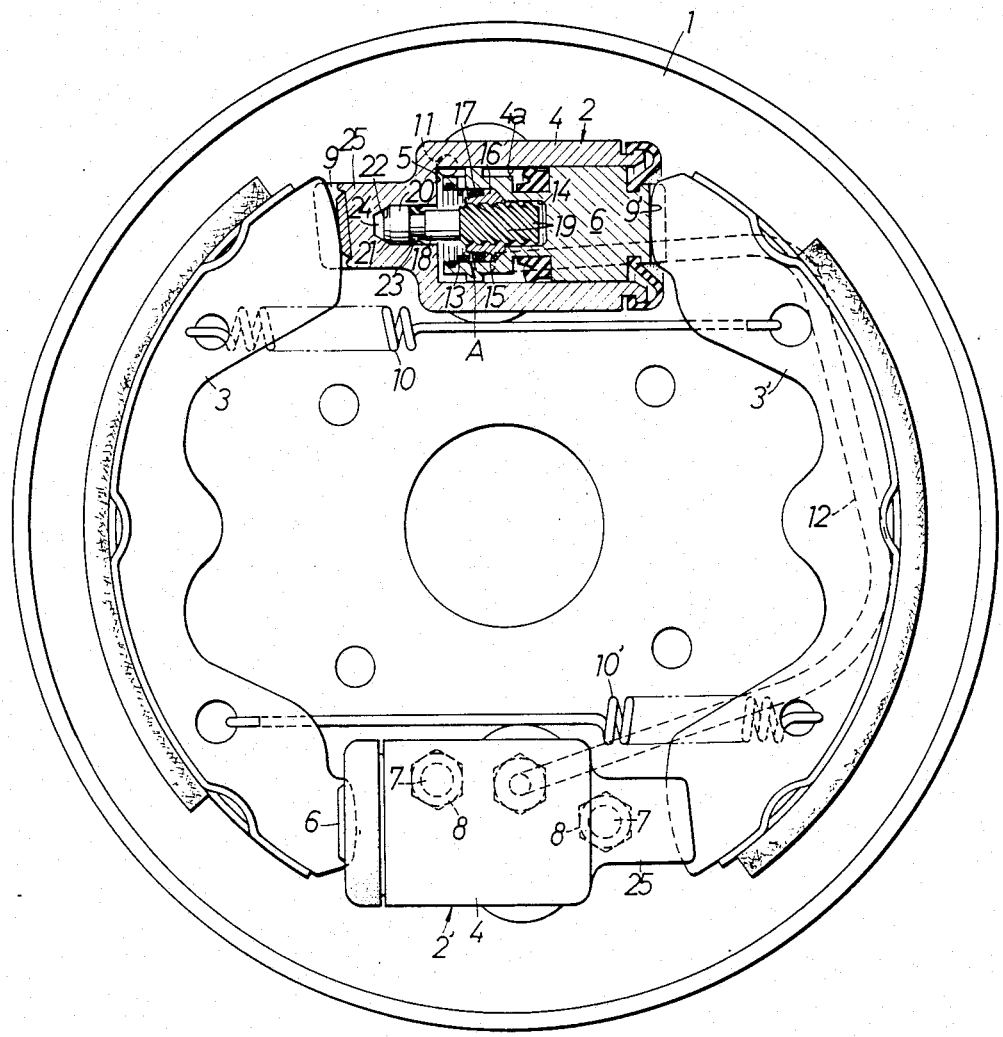
FIG. 1 is a vertical sectional view of the whole essential part of a drum brake in which a self-compensating device in accordance with the first embodiment of the present invention is incorporated.

Now, the present invention will be described in a greater detail hereunder with reference to the accompanying drawings which illustrate preferred embodiments of the invention.

In the drawings, parts or components which are equivalent to one another in the embodiments are designated by the same numerals and letters.

Referring first to FIG. 1, there is illustrated a self-compensating device in accordance with the first embodiment of the invention which is applied to a two leading shoe type drum brake for a motorcar. Specifically, a pair of symmetrically located wheel cylinders 2 and 2' and a pair of symmetrically located brake shoes 3 and 3' are arranged within a back plate 1 in a symmetrical relation relative to the center of the latter, said back plate 1 being fixedly secured to the chassis of the motorcar. A brake drum surrounding the brake shoes 3 and 3' and adapted to be rotated together with wheels is not shown in the drawing for the simplification of illustration.

Each of the wheel cylinders 2 and 2' is constructed by a combination of a cylinder housing 4 having a cylinder bore 4a formed therein with one end open. A piston 6 is slidably fitted into said cylinder bore 4a to define a hydraulic chamber 5. As is apparent from the drawing, the cylinder housing 4 is integral with an anchor 25 located at the opposite end to the opening of the cylinder bore 4a and it is fixed to the back plate 1 with the aid of bolts 7 and nuts 8. An engagement groove 9 is provided on the outermost end face of the anchor 25, whereas another engagement groove 9' is provided on the outermost end face of the piston 6. The engagement grooves 9 and 9' are adapted to receive therein the corresponding end parts of the brake shoes 3 and 3' in an engaging relation. Tension coil springs 10 and 10' are extended between both the brake shoes 3 and 3' so as to energize them in such a direction that they approach to one another. The operative engagement of the brake shoes 3 and 3' to the grooves 9 and 9' inhibits the cylinder housing 4 from being rotated relative to the piston 6.

The hydraulic chamber 5 in the upper wheel cylinder 2 includes an inlet port 11 through which hydraulic pressure outputted from a brake master cylinder (not shown) is introduced thereinto and moreover a communicating pipe 12 is provided between both the wheel cylinders 2 and 2' so as to transmit hydraulic pressure in the upper wheel cylinder 2 to the lower wheel cylinder 2'.

The hydraulic chamber 5 in the wheel cylinders 2 and 2' is equipped with a self-compensating device A of the invention. The self-compensating device for the upper wheel cylinder 2 is identical to that for the lower wheel cylinder 2' and therefore description will be made only with respect to the self-compensasting device A for the upper wheel cylinder 2.

The piston 6 includes a stepped bore portion at its inner end part, said stepped bore portion comprising a larger bore 13 and a smaller bore 14 and having a conical abutment face 15 formed in an intermediate part located therebetween. An adjustment nut 16 is slidably fitted into the larger bore 13 so as to detachably abut against the abutment face 15 under the influence of resilient force imparted by a compression coil spring 17 of which one end part is anchored at the inner end of the piston 6.

In addition to the operative function of allowing the adjustment nut 16 to abut against the abutment face 15 with the resilient force, the coil spring 17 is effective in inhibiting the adjustment nut 16 from being rotated with the aid of frictional engagement or concavo-convex engagement of the coil spring 17 to the adjustment nut 16.

An adjustment rod 18 is extended through the adjustment nut 16 along the center axis of the latter, said adjustment rod 18 having a multithread screw 19 by means of which it is operatively engaged to the adjustment nut 16. A part of the multithread screw 19 is slidably fitted into the smaller bore 14. A thread engagement part between the adjustment nut 16 and the adjustment rod 18 is dimensioned so as to maintain an adequate working clearance for each of the brake shoes 3 and 3', i.e., a predetermined axial idle clearance corresponding to an adequate clearance between each of the brake shoes 3 and 3' and the brake drum (not shown) so that both the larger bore 13 and the smaller bore 14 are communicated with one another at all time by way of the aforesaid idle clearance. Owing to the arrangement of the adjustment nut 16 and the adjustment rod 18 as described above hydraulic pressure introduced into the hydraulic chamber 5 is transmitted to the right end face of the adjustment rod 18 fitted into the smaller bore 14.

Further, the adjustment rod 18 includes a clutch member 20 at its left end formed integrally therewith, said clutch member 20 being rotatably fitted into a bag-shaped clutch bore 21 at the left end part of the cylinder housing 4, while facing a conical clutching face 22 formed on the innermost wall of the clutch bore 21. To prevent hydraulic pressure in the hydraulic chamber 5 from acting on the clutching face 22, a sealing member 23 is slidably fitted into the clutch bore 21. A bag chamber 24 is defined by the foremost end part of the clutch member 20 at the dead end of the clutch bore 21.

Next, operation of the self-compensating device of the invention as illustrated in FIG. 1 will be described below.

As the brake master cylinder (not shown) is actuated to effect braking, hydraulic pressure outputted therefrom is introduced into the hydraulic chamber 5 in the upper wheel cylinder 2 and it is then transmitted to the lower wheel cylinder 2' via the communicating pipe 12 whereby the pistons 6 in the wheel cylinders 2 and 2' are caused to move outward and thereby the corresponding brake shoes 3 and 3' are expanded until they are brought in pressure contact with the inner surface of the brake drum. As a result the brake drum, i.e., the wheel is braked.

During the braking operation hydraulic pressure in the hydraulic chamber 5 exerts no thrusting on the adjustment nut 16 because its both end faces are equally exposed to hydraulic pressure. On the contrary, the clutch member 20 is subjected to thrusting force of which value is determined by the cross-sectional area of the clutch member 20 multiplied by the aforesaid hydraulic pressure, said thrusting force being directed toward the clutching face 22. Thus, connecting force developed between the clutch member 20 and the clutching face 22 is determined by the thrusting force.

While a motorcar is operated in the normal braking condition, the hydraulic chamber 5 has comparatively low hydraulic pressure and therefore as the lining of the brake shoes 3 and 3' wears, the piston 6 assumes its initial position located further outward of the former one. Thus, the adjustment nut 16 is displaced together with the piston 6 while it is brought in contact with the abutment face 15 with the aid of resilient force of the coil spring 17, whereby the clutch member 20 is parted away from the clutching face 22 against the aforesaid thrusting force. After the clutch member 20 is displaced away from the clutching face 22, it is caused to move toward the clutching face 22 by threadably rotating in the adjustment nut 16 which has been firmly held by thrust engagement so as not to be rotated, until it is engaged with the face 22 again. During such displacement of the clutch member 20, air held in the bag chamber 24 is freely expanded or compressed as the clutch member 20 moves forward or backward and therefore engagement of the clutch member with or disengagement of the same from the clutching face 22 is effected without any hindrance. As will be apparent from the above description, self-compensating function is achieved for compensating wear of the lining of the brake shoes 3 and 3'.

Next, when hydraulic pressure in the hydraulic chamber 5 is decreased for the purpose of releasing from the braked condition, the brake shoes 3 and 3' are displaced inward under the influence of resilient force of the return springs 10 and 10'. The resilient force of the return springs 10 and 10' is then transmitted to the clutch member 20 by way of the piston 6, the adjustment nut 16 and the adjustment rod 18, causing the clutch member 20 to thrust against the clutching face 22 until frictional engagement is established therebetween without any rotation of the clutch member 20 relative to the clutching face 22. At the same time the adjustment nut 16 is inhibited from rotation relative to the adjustment rod 18 and therefore the piston 6 and the adjustment nut 16 can be displaced inward just by a distance of stroke equal to the idle clearance in thread engagement between the adjustment nut 16 and the adjustment rod 18. As a result an adequate clearance is assured between the lining of the brake shoes 3 and 3′ and the inner surface of the brake drum corresponding to the aforesaid idle clearance.

Further, in case when heavy braking is performed, the above-mentioned self-compensating function is practiced until hydraulic pressure in the hydraulic chamber 5 is raised to a predetermined level where elastic deformation takes place with the brake shoes 3, 3′, brake drum and the like, and as hydraulic pressure increases in excess of the predetermined level, the clutch member 20 is brought in frictional contact against the clutching face 22 due to increased thrusting force to be exerted on the clutch member 20 under the influence of hydraulic pressure whereby both the clutch member 20 and the adjustment rod 18 are inhibited from rotation. Since the adjustment nut 16 which has been originally arranged so as not to be rotated is mounted on the adjustment rod 18, the abutment face 15 on the piston 6 is caused to move away from the adjustment nut 16 as the piston 6 is displaced outward further due to elastic deformation of the brake drum and others. Thus, the above-mentioned self-compensating function is stopped.

Figure 2:
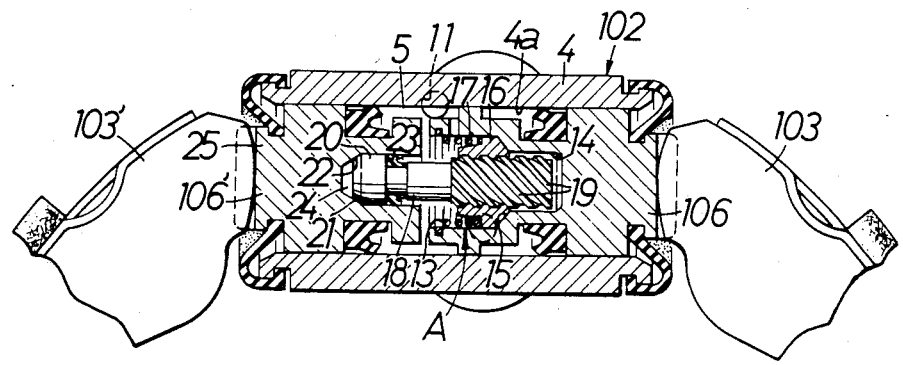
FIG. 2 is a fragmental vertical sectional view of an essential part of a drum brake in which a self-compensating device in accordance with the second embodiment of the present invention is incorporated.

Next, FIG. 2 illustrates a self-compensating device A in accordance with the second embodiment of the invention which is applied to a drum brake of the type including a leading shoe 103 and a trailing shoe 103′. This embodiment is identical to the foregoing embodiment with the exception of the arrangement that an abutment face 15 is formed on the first piston 106 which is slidably fitted into the wheel cylinder 102 for actuating the leading shoe 103 and a clutching face 22 is formed on the second piston 106′ for actuating the trailing shoe 103′. Hence, same or similar parts and components in FIG. 2 as those in the foregoing embodiment are identified with the same reference numerals.

As will be readily understood from the above description, the self-compensating device of the invention as illustrated in FIGS. 1 and 2 have advantageous features that in case of heavy braking where hydraulic pressure in the hydraulic chamber increases in excess of a predetermined level any excessive compensation is effectively avoided which may be caused by elastic deformation of parts and components in the braking mechanism and thereby an occurance of phenomenon of so-called brake shoe dragging is prevented which may take place due to excessive compensation, that the self-compensating device can be compactly incorporated in the hydraulic chamber and that movable parts and components in the device can be well lubricated with hydraulic oil in the hydraulic chamber. However, it has been found with respect to the self-compensating devices in accordance with the first and second embodiments of the invention that if the sealing member fitted into the hydraulic chamber is damaged or injured for any reason and thereby leakage occurs therefrom, there arises a fear of causing such a malfunction that the cavity located beyond the clutching face, i.e., the bag chamber is filled with hydraulic oil which leaks from the hydraulic chamber, resulting in frictional contact of the clutch member with the clutching face being inhibited.

Figure 4:
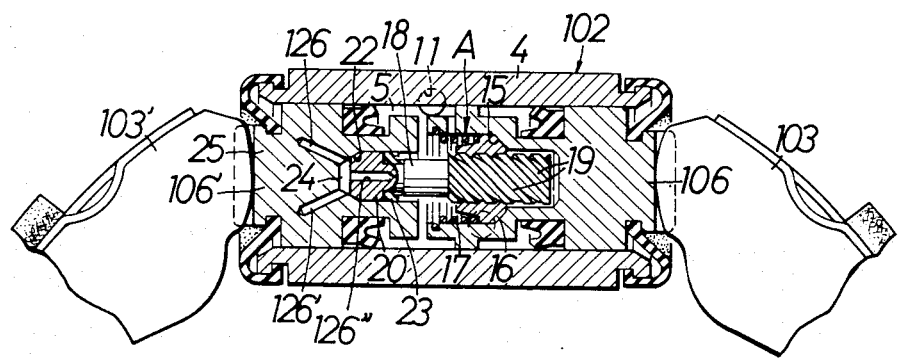
FIG. 4 is a fragmental vertical sectional view of an essential part of a drum brake in which a self-compensating device in accordance with the fourth embodiment of the present invention is incorporated.
Figure 3:
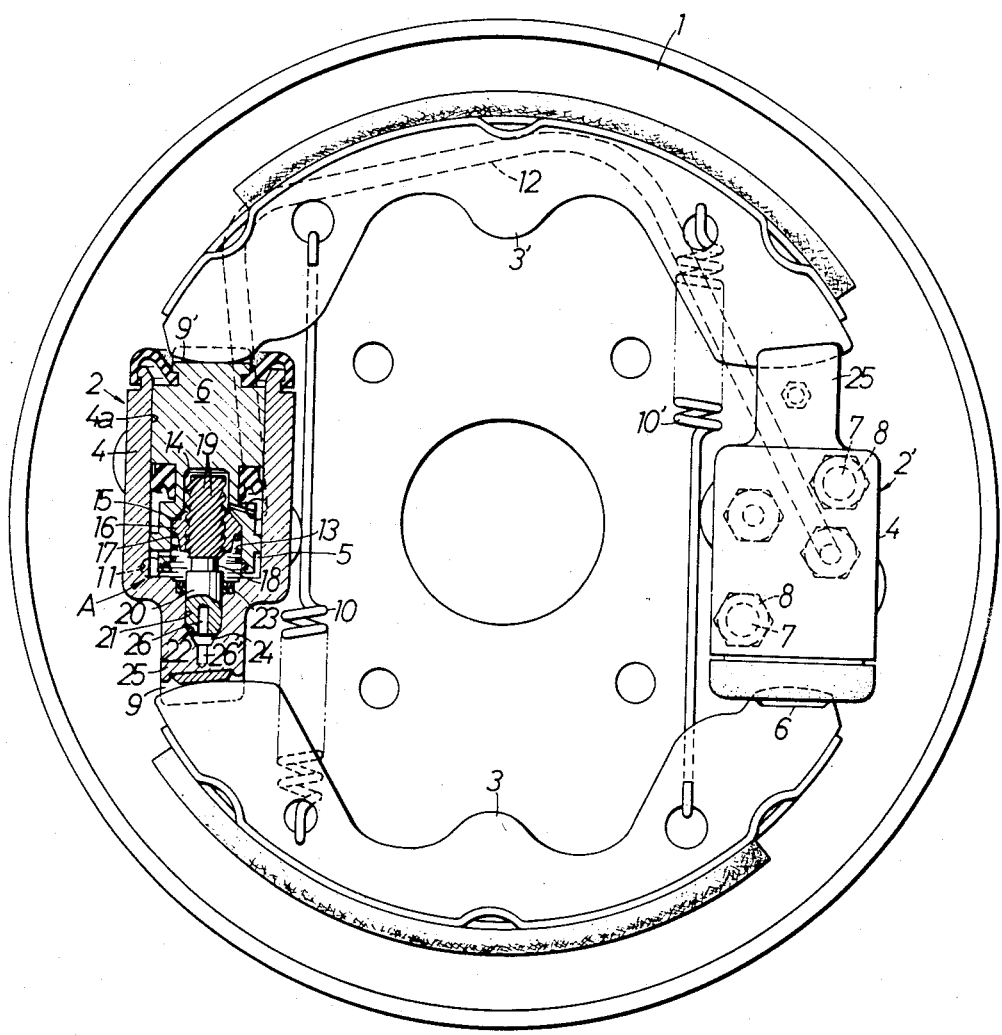
FIG. 3 is a vertical sectional view of the whole essential part of a drum brake in which a self-compensating device in accordance with the third embodiment of the present invention is incorporated.

FIGS. 3 and 4 illustrate self-compensating devices in accordance with the third and fourth embodiments of the invention, respectively, which are entirely free from the foregoing problem.

First, the third embodiment as illustrated in FIG. 3 is concerned with a self-compensating device incorporated in a two leading shoe type drum brake for a motorcar. Specifically, a pair of wheel cylinders 2 and 2′ are symmetrically arranged within a back plate 1 fixedly secured to the chassis, whereas a pair of brake shoes 3 and 3′ are arranged symmetrically relative to the center of the back plate 1 within the latter. The self-compensating device as illustrated in the drawing is constructed in the substantially same manner as the first embodiment with the exception of the arrangement that the clutch member 20 includes an air storage 26 extending upward in the longitudinal direction of the adjustment rod 18, said air storage 26 being opened to the bag chamber 24 located at the lowermost end of the clutch bore 21.

Further, in this embodiment another air storage 26′ is provided which extends downward from the bag chamber 24. The arrangement of the air storage 26′ in that way makes it possible to mount the wheel cylinder 2 in in an inverted state just like the righthand wheel cylinder 2′ in the drawing in which the piston 6 is adapted to move downward, because the air storage 26′ functions as an air storage extending upward from the bag chamber 24. Thus, the wheel cylinders 2 and 2′ may be mounted in any direction, as long as they are vertically mounted.

Also in this embodiment the self-compensating device has of course an advantageous feature that reliable braking is achieved at all time while a constant working clearance is maintained between the brake drum and the brake shoes 3 and 3′ just like in the first and second embodiments. In addition to this, owing to the arrangement of the air storage 26 it is assured that air in the bag chamber 24 is naturally urged into the upwardly extending air storage 26 without any adverse flowing into the hydraulic chamber 5 and therefore the air storage 26 is filled with air at all time without any introduction of hydraulic oil thereinto even when the sealing member 23 is damaged or injured for any reason and thereby hydraulic oil leaks from the hydraulic chamber 5 into the bag chamber 24. Another advantageous feature of this embodiment is that as the clutch member 20 is thrusted toward the clutching face 22, air held in the air storage 26 is compressed and thereby the former is correctly engaged with the latter without any hindrance by air.

FIG. 4 illustrates a self-compensating device A in accordance with the fourth embodiment of the invention which is applied to a drum brake of the type including a leading shoe 103 and a trailing shoe 103′ just like in the second embodiment. In this embodiment a wheel cylinder 102 includes a horizontally extending cylinder housing 4 and a pair of oppositely located pistons 106 and 106′ with a hydraulic chamber 5 disposed therebetween. The fourth embodiment of the invention consists in that the self-compensating device arranged between both the pistons 106 and 106′ includes an air storage 126 extending from the bag chamber 24 at an upward inclination angle in the piston 106′, an air storage 126′ extending from the bag chamber 24 at a downward inclination angle in the piston 106′ and an air storage 126″ extending from the bag chamber 24 in the horizontal direction in the clutch member 20 fitted into the piston 106'. Owing to the arrangement of the air storages 126, 126' and 126" extending from the bag chamber 24 in three directions on the vertical plane it is assured that at least one or two of the air storages 126, 126' and 126" serve as an upwardly extending air storage without fail irrespective of how the wheel cylinder 102 is mounted in any direction, i.e., in the transverse direction, in the vertical direction or in the inclined direction. As a result the self-compensating device of the invention becomes applicable in a wider area of utilization.

Figure 5:
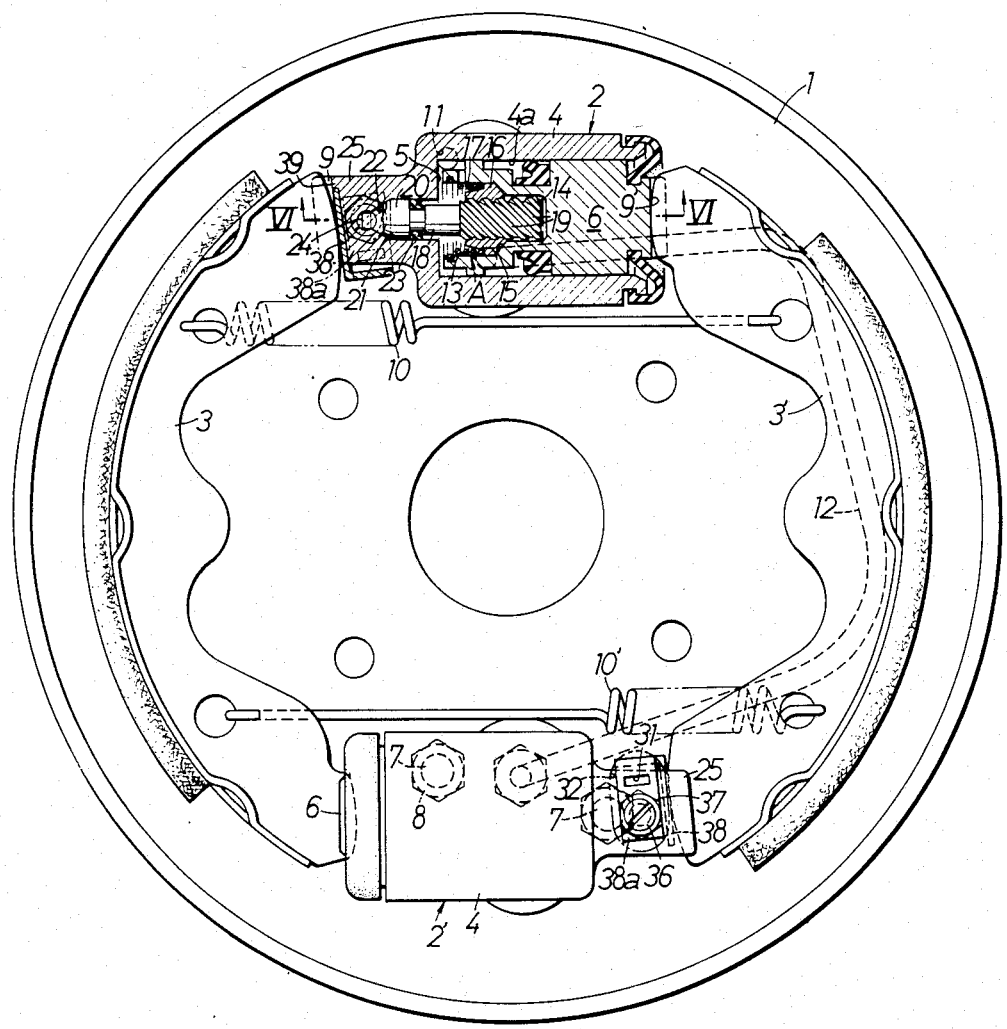
FIG. 5 is a vertical sectional view of the whole essential part of a drum brake in which a self-compensating device in accordance with the fifth embodiment of the present invention is incorporated.
Figure 6:
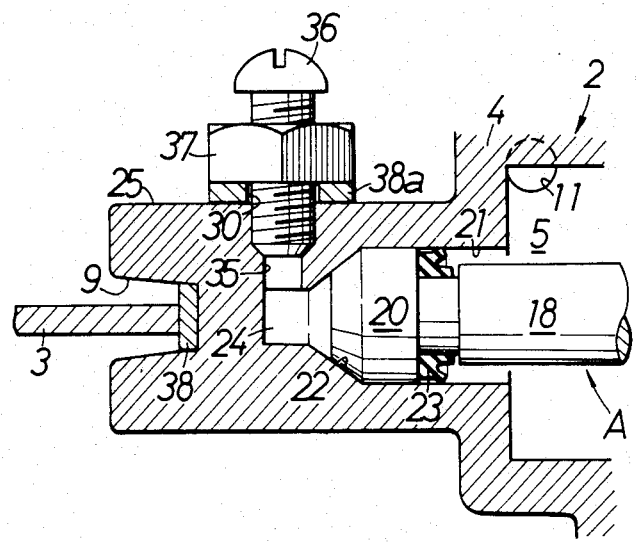
FIG. 6 is a partial sectional view of the drum brake taken in line VI—VI in FIG. 5, shown in an enlarged scale.
Figure 7:
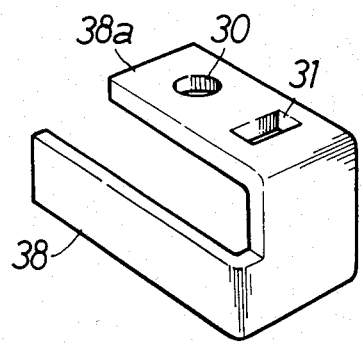
FIG. 7 is a perspective view of a distance piece fitted to an anchor of the wheel cylinder in FIG. 5, shown in an enlarged scale.

Next, FIGS. 5 to 7 illustrate a self-compensating device A in accordance with the fifth embodiment of the invention which is applied to a disc brake. This embodiment is intended to assure that inspecting and maintaining operations are easily carried out for the disc brake at a high operative efficiency. In this embodiment a ventilation hole 35 leading to the bag chamber 24 is opened to the outside at the upper surface of the anchor 25 and it is normally closed with a screw plug 36. The screw plug 36 is fitted with a lock nut 37. During the assembling of the self-compensating device A, the clutch member 20 is easily inserted into the clutch bore 21 without any resistance which may be caused by air in the bag chamber 24, if the screw plug 36 is disconnected from the anchor 25 and the bag chamber 24 is open to the atmosphere.

A spacer 38 made of steel plate is disposed in the abutment area where the anchor 25 abuts against the corresponding brake shoe 3 or 3'. To define the position of the spacer 38 in the abutment area a locating projection 39 is projected from the bottom surface of the abutment groove 9 on the anchor 25 so that the foremost end of the spacer 38 abuts against the locating projection 39. The spacer 38 is dimensioned to have a thickness more than the maximum allowable depth of roughness which is developed on the inner surface of the brake drum as the latter wears. Further, the spacer 38 has an attachment piece 38a formed integrally therewith which is contoured so as to fit with the outer surface of the anchor 25. The attachment piece 38a is formed with a fitting hole 30 and a tool hole 31. By inserting the screw plug 36 through the attachment hole 30 and tightening the locknut 37 the attachment piece 38a is firmly secured to the anchor 25. To facilitate handling of the attachment piece 38a from the outside a working window 32 is provided on the end wall plate (not shown) of the brake drum.

When the brake drum is to be removed for the purpose of replacing the used brake shoes 3 and 3' with new ones or the like purpose, the brake drum is rotated until the working window 32 on the brake drum assumes the position located opposite to the attachment piece 38a. A suitable tool is then inserted through the working window 32 to loosen the lock nut 37 and unscrew the screw plug 36. Next, another tool is inserted through the working window 32 to engage with the tool hole 31 and draw the spacer 38 from the abutment area between the anchor 25 and the brake shoe 3 or 3' by pulling the tool. On completion of removal of the spacer 38, the brake shoes 3 and 3' are caused to be displaced toward one another by a distance equal to the thickness of the spacer 38 whereby an ample clearance is provided for axial removal of the brake drum.

It should be of course understood that the removed of spacer 38 can be used again by securing it to the anchor 25 after completion of replacement of the used brake shoes 3 and 3' with new ones.

Finally, it should be noted that the arrangement of the spacer as illustrated in FIGS. 5 to 7 may be employed for the combined shoe type drum braking system including a leading shoe and a trailing shoe in which the wheel cylinder and the anchor are disposed separately from one another as illustrated in FIGS. 2 and 4.

What is claimed is:

1. In a self-compensating device for a drum brake of the type including a first member and a second member which together define a hydraulic chamber in a wheel cylinder and are slidably but non-rotatably arranged relative to one another so that brake shoes are actuated by displacement of the first and second members away from one another which is initiated by hydraulic pressure introduced into the hydraulic chamber, the improvement comprising;
    an adjustment nut disposed in one of the first and second members so as not to be rotated relative to the latter, said adjustment nut being adapted to detachably abut against an abutment face formed on said one of the members,
    a spring means for urging the adjustment nut toward said abutment face and for preventing rotation of said adjustment nut relative to one of said first and second members,
    an adjustment rod threadably fitted through the adjustment nut, said adjustment rod including a multithread screw formed on a part thereof for assuring threadable engagement with the adjustment nut, and
    a clutch member integrally secured to one end of the adjustment rod and rotatably supported in a clutch bore formed in the other one of the first and second members to cooperate with a clutching face formed on the inner wall of said clutch bore at the deepest part thereof, said clutch member being adapted to come in frictional engagement with the clutching face when the clutch member is thrust toward the clutching face by hydraulic pressure exceeding a predetermined level in the hydraulic chamber and when the clutch member is thrust toward the clutching face under the influence of resilient force imparted by a return spring extended between both the brake shoes.

2. A self-compensating device as defined in claim 1, further comprising a sealing member fitted into the other one of the first and second members for liquid-tightly separating the clutching face from the hydraulic chamber and at least one air storage provided in the other one of the first and second members or in the clutch member and extending upward from a bag chamber located at the deepest part of the clutch bore.

3. A self-compensating device as defined in claim 2, wherein two air storages are provided, one of them being formed in the clutch member and extending from the end face thereof in the axial direction and the other one extending from the deepest part of the bag chamber in the direction opposite to the foregoing air storage.

4. A self-compensating device as defined in claim 2, wherein three air storages are provided, one of them being formed in the clutch member and extending in the axial direction from the end face thereof and the other twos being formed in the other one of the first and second members and extending from the deepest part of the bag chamber at two different inclination angles, respectively, which are directed symmetrically relative to the axis of the clutch member.

5. A self-compensating device as defined in claim 1, further including an anchor adapted to rotatably hold a corresponding brake shoe and a distance piece removably disposed in the abutment area between said anchor and said corresponding brake shoe, said distance piece being removed from the abutment area by operation conducted from the outside.

6. A self-compensating device as defined in claim 5, wherein the distance piece includes an attachment piece formed integrally therewith by bending at a right angle relative to the distance piece for tight fitting with the outer surface of the anchor.

7. A self-compensating device as defined in claim 6, wherein the attachment piece is formed with a screw fitting hole and a screw plug is inserted through said fitting hole for securing the distance piece to the anchor.

8. A self-compensating device as defined in claim 7, wherein the attachment piece is formed with a tool hole adapted to accommodate a suitable tool inserted from the outside to draw the distance piece in the axial direction of the drum brake.

9. A self-compensating device as defined in claim 6, wherein a thread hole is provided on the anchor, through which hole the screw plug is to be threadably inserted.

10. A self-compensating device as defined in claim 9, wherein said thread hole also serves as a ventilation hole for releasing air within the bag chamber to the outside.

11. A self-compensating device as defined in claim 1, wherein the first member comprises a wheel cylinder with an anchor formed integrally therewith for actuating one of the brake shoes and the second member comprises a piston slidably fitted into said wheel cylinder for actuating the other brake shoe.

12. A self-compensating device as defined in claim 1, wherein the first member comprises a wheel cylinder and the second member comprises a first piston and a second piston both of which are slidably fitted into said wheel cylinder, said first piston serving to actuate one of the brake shoes and said second piston serving to actuate the other one.

13. A self-compensating device as defined in claim 1, wherein said spring means is associated with said adjustment nut through frictional engagement.

14. A self-compensating device as claimed in claim 1, wherein said spring means is associated with said adjustment nut through concavo-convex engagement.

* * * * *